United States Patent
Wang et al.

(10) Patent No.: US 10,142,693 B2
(45) Date of Patent: Nov. 27, 2018

(54) VIDEO DISTRIBUTION CONTROL

(71) Applicant: Telefonaktiebolaget LM Ericsson (publ), Stockholm (SE)

(72) Inventors: Le Wang, Helsinki (FI); Maziar Mehrabi, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/541,033

(22) PCT Filed: Feb. 5, 2015

(86) PCT No.: PCT/SE2015/050124
§ 371 (c)(1),
(2) Date: Jun. 30, 2017

(87) PCT Pub. No.: WO2016/126176
PCT Pub. Date: Aug. 11, 2016

(65) Prior Publication Data
US 2017/0374422 A1  Dec. 28, 2017

(51) Int. Cl.
*H04N 7/167* (2011.01)
*H04N 21/4627* (2011.01)
(Continued)

(52) U.S. Cl.
CPC ....... *H04N 21/4627* (2013.01); *H04B 10/116* (2013.01); *H04N 21/4223* (2013.01); *H04N 21/44008* (2013.01); *H04N 21/8358* (2013.01)

(58) Field of Classification Search
CPC .......... H04N 21/4627; H04N 21/4223; H04N 21/44008; H04N 21/8358; H04B 10/116
(Continued)

(56) References Cited

U.S. PATENT DOCUMENTS 7,272,240 B2 * 9/2007 Goldberg .............. G06T 1/0028
382/100
8,837,952 B2 * 9/2014 Noh ................... H04B 10/2503
398/141
(Continued)

FOREIGN PATENT DOCUMENTS

GB  2425906  11/2006
WO  02/27431  4/2002
(Continued)

OTHER PUBLICATIONS

Rajagopal, N., et al., "Visual Light Landmarks for Mobile Devices," Proceedings of the 13th International Symposium on Information Processing in Sensor Networks, Apr. 15-17, 2014, pp. 249-260.
(Continued)

*Primary Examiner* — Nnenna N Ekpo
(74) *Attorney, Agent, or Firm* — Sage Patent Group

(57) ABSTRACT

A bitstream of encoded video data captured by a camera of a user device is received and decoded into a stream of decoded video frames. A light pattern representing a VLC signal captured by the camera is identified in at least one decoded video frame and decoded into a DRM identifier. Distribution of the bitstream is controlled based on a comparison of the DRM identifier and a defined DRM identifier. Hence, VCL is used to add watermarks to recorded video data and where such watermarks can be used to control distribution of copyright or digital rights protected video content.

23 Claims, 11 Drawing Sheets

(51) Int. Cl.
*H04N 21/44* (2011.01)
*H04N 21/8358* (2011.01)
*H04B 10/116* (2013.01)
*H04N 21/4223* (2011.01)

(58) Field of Classification Search
USPC .............................. 725/28, 31; 380/201, 203
See application file for complete search history.

(56) References Cited

U.S. PATENT DOCUMENTS

| | | | | |
|---|---|---|---|---|
| 8,942,564 | B2* | 1/2015 | Jovicic | H04B 10/1149 398/140 |
| 9,191,107 | B2* | 11/2015 | Manahan | H04B 10/1149 |
| 9,525,486 | B2* | 12/2016 | Poola | H04B 10/116 |
| 9,706,426 | B2* | 7/2017 | Poola | H04L 61/6077 |
| 2005/0058319 | A1* | 3/2005 | Rhoads | G06F 17/241 382/100 |
| 2010/0209105 | A1* | 8/2010 | Shin | H04B 10/1149 398/58 |

FOREIGN PATENT DOCUMENTS

WO 02/086803 10/2002
WO 06/060283 6/2006

OTHER PUBLICATIONS

International Search Report and Written Opinion of the International Searching Authority for International Application No. PCT/SE2015/050124 (dated Jun. 15, 2015) 13 pages.

Yin, P., et al., "Classification of Video Tampering Methods and Countermeasures Using Digital Watermarking," XP008026987, Proceedings of the SPIE, SPIE—International Society for Optical Engineering, US, vol. 4518, Aug. 21, 2001, pp. 239-246.

Atrey, P.K., et al., "A Hierarchical Signature Scheme for Robust Video authentication Using Secret Sharing", XP010681859, Proceedings of the 10th International Multimedia Modelling Conference, Jan. 5-7, 2004, Piscataway, NJ, pp. 330-337.

Doërr, G., et al. "How to Combat Block Replacement Attacks?" XP019019910, Information Hiding Lecture Notes in Computer Science, Jan. 1, 2005, Springer, Berlin, DE, pp. 161-175.

* cited by examiner

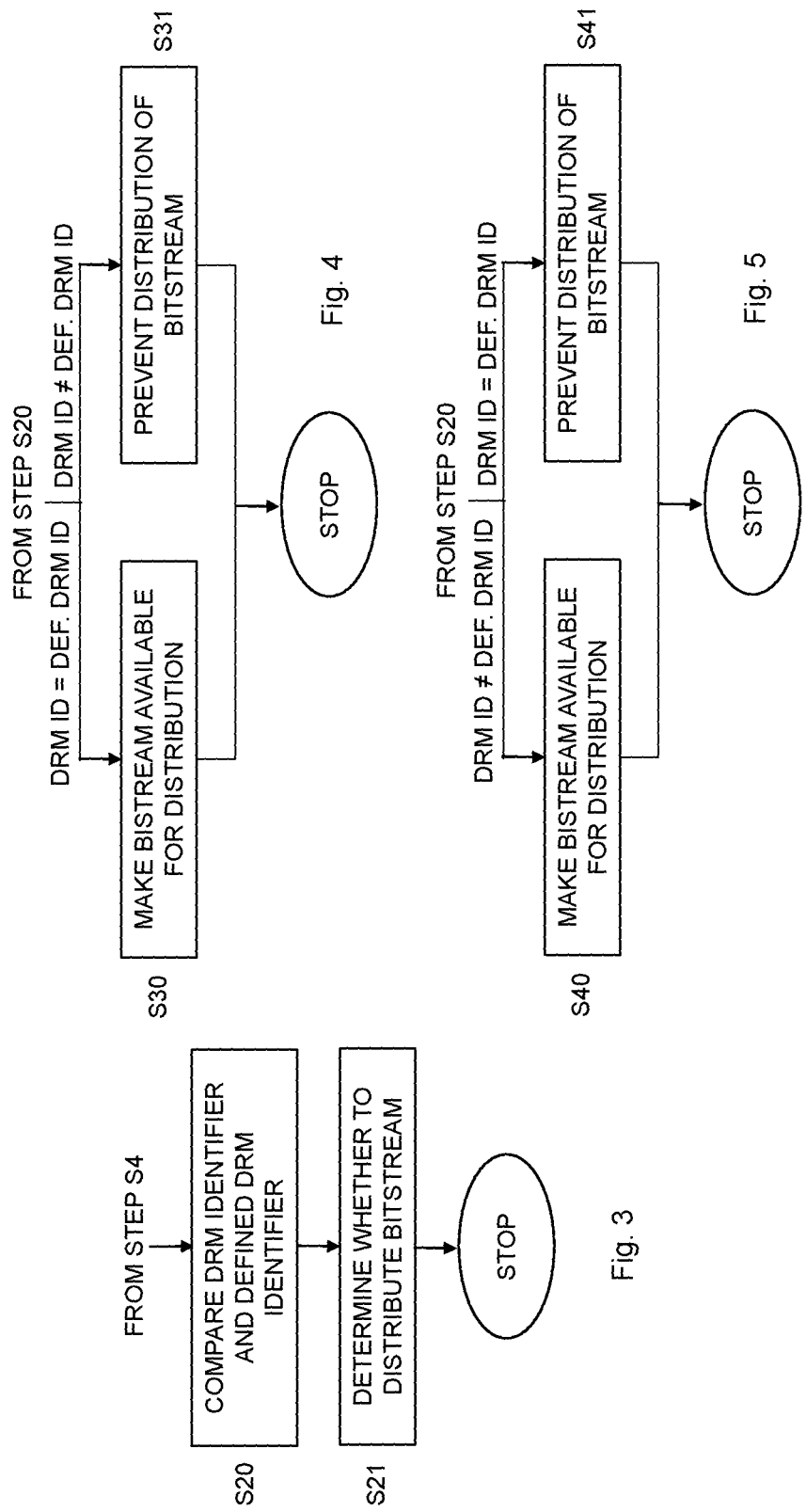

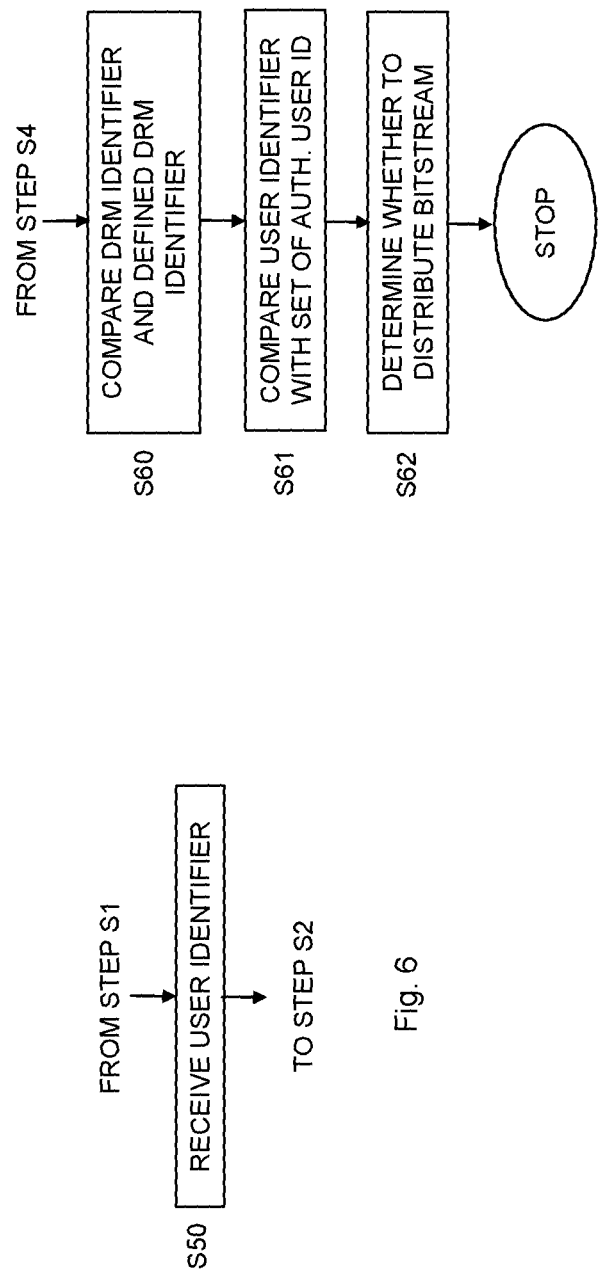

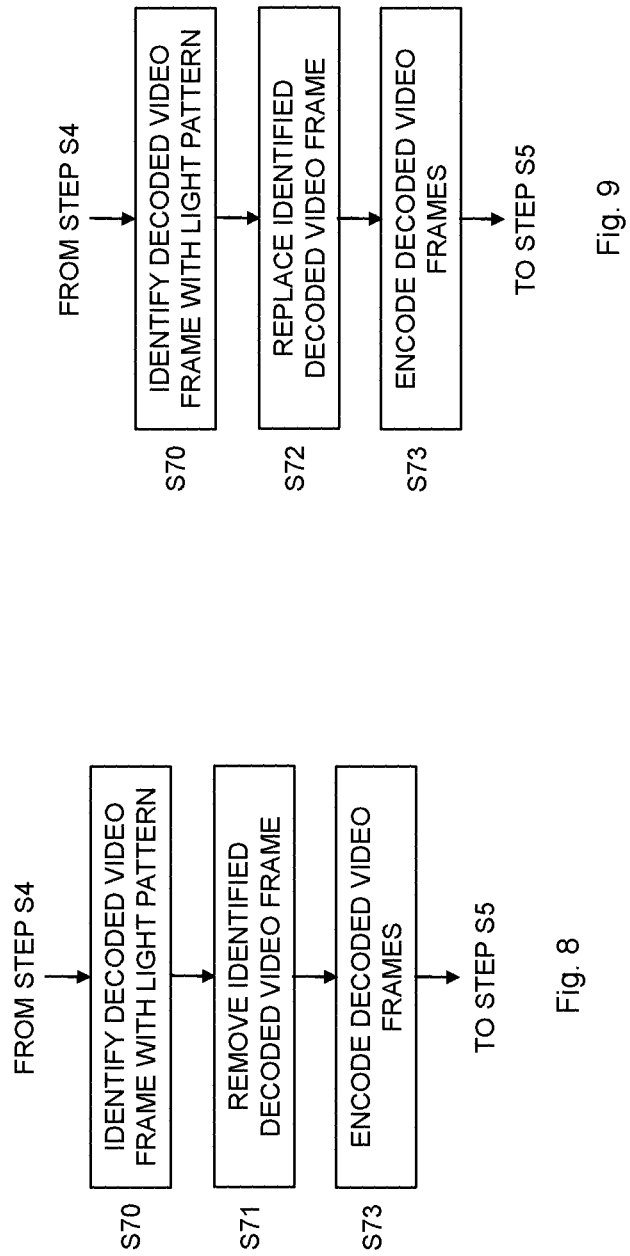

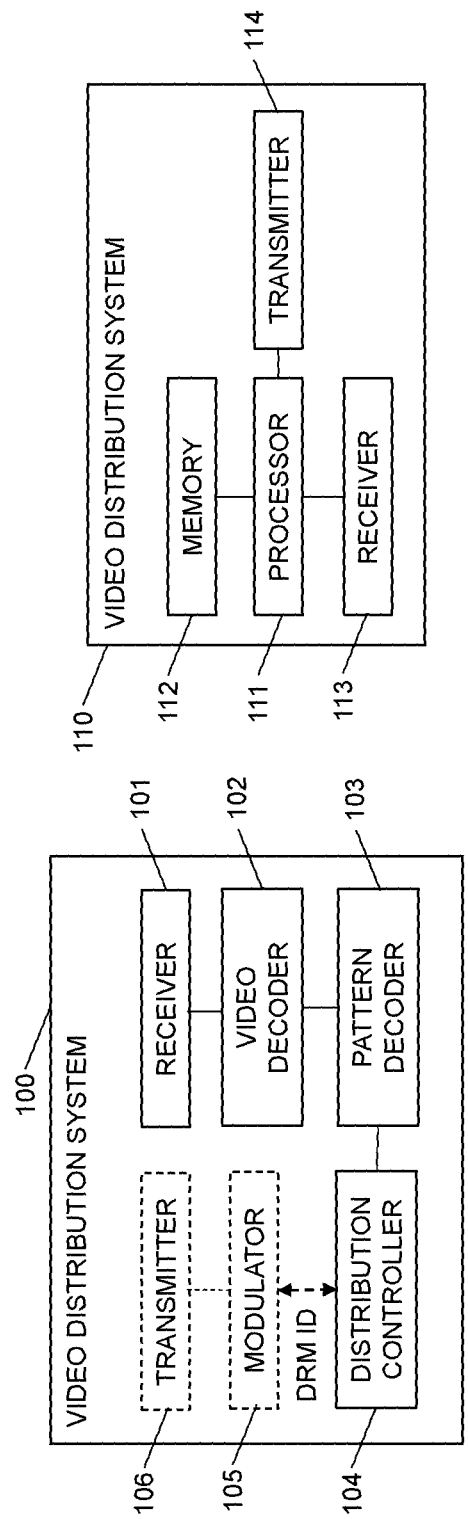

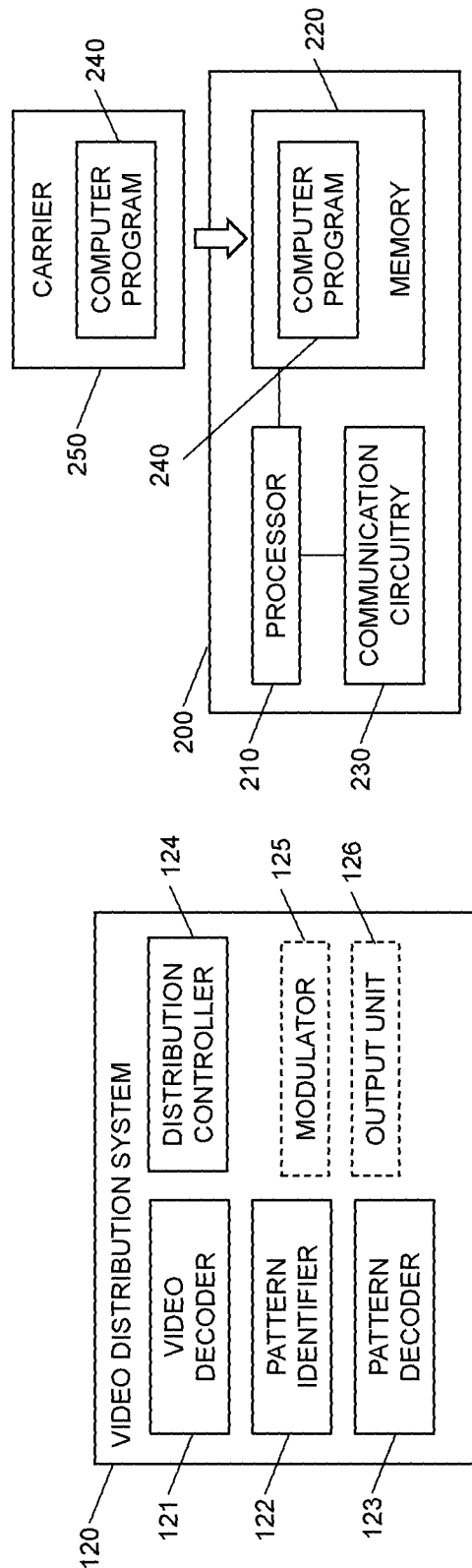

VIDEO DISTRIBUTION CONTROL

CROSS REFERENCE TO RELATED APPLICATIONS

This application is a 35 U.S.C. § 371 national stage application of PCT International Application No. PCT/SE2015/050124, filed on Feb. 5, 2015, the disclosure and content of which is incorporated by reference herein in its entirety.

TECHNICAL FIELD

The present embodiments generally relate to video distribution, and in particular to controlling video distribution by implementing digital rights management (DRM) to video content obtained from user devices.

BACKGROUND

The advance of high-speed mobile Internet and capacity of user devices, such as mobile phones, smartphones and tablets, has given rise to a new way of consuming mobile live video streaming services. There is also a high demand from users to record or film a social event, e.g. a football game or a music festival, in order to present the users' own version of storytelling.

However, not all the media content is allowed to be uploaded to distributing or streaming service providers, such as for live broadcast, due to copyright regulations and other digital rights of certain events. It is extremely difficult to forbid users in the audience from recording the event and distributing it. Instead of regulating the users, it is more practical to monitor the distributing or streaming service providers.

Current approaches mainly depend on copyright violation reports. For example, authorized media content distributers keep close watch on distributing or streaming service providers to detect any violation of media content distribution. If distribution of digital rights or copyright protected media content is detected, a request is sent to the distributing or streaming service providers to stop the media content distribution.

Another approach is to add watermarks to digital rights or copyright protected media content, which, later on, can be used for content identification. However, adding a logo or other watermark results in a degradation of user experience. Various watermarking techniques have been proposed in the art.

Color plane modification provides low visible watermarking by modifying different color planes of a digital media, such as the cyan, magenta, and yellow planes. This method is performed at post-record time. This type of watermarking would require performing the color plane modification at the different user devices. Hence, all user devices need to be modified in order to enable color plane modification. The watermarking type also costs processing power and time.

In masking the digital media, the digital media goes through a filter and a mask is applied to the visual content. The drawbacks are similar to the color plane modification, i.e. post-record time processing and power and time demanding. This type of watermarking also visibly degrades the digital media.

Distortion using invisible light prevents third parties from recording protected media content but does not actually provide watermarking. By introducing pulsing infra-red and ultra-violet waves into the environment, the protected media content seen by cameras is distorted. New modern cameras are, however, equipped with infra-red and ultra violet filters. Therefore this method is not applicable anymore. In a variant, distortion can be introduced by using visible light. The advantage is that modern cameras cannot bypass this distortion. The disadvantage is that the recorded media content is completely distorted, thereby significantly lowering the user experience.

WO 2014/179810 discloses watermarking the audio channel of a multimedia content. A limitation of such an approach is that audio metadata, such as watermarks, is very vulnerable to filtering and transcoding. Hence, such watermarks can easily be removed and filtered by an audio transcoder or compressor.

There is therefore a need for a technology to impose digital rights management and copyright protection onto video content uploaded from users recording a social event. It is in particular a need for such a technology that does not require modifications of the user devices used by the users to record the social event. The technology should not degrade the video content in such a way that the user experience when watching the video content is significantly lowered.

SUMMARY

It is an objective to provide an improved video distribution.

It is a particular objective to control video distribution by implementing DRM to video content obtained from user devices.

These and other objectives are met by embodiments as disclosed herein.

An aspect of the embodiments relates to a video distribution method comprising receiving, from at least one user device, a bitstream of encoded video frames representing video data captured by a camera of or connected to the user device. The method also comprises decoding encoded video frames of the bitstream to get a stream of decoded video frames. The method further comprises identifying, in at least one decoded video frame of the stream of decoded video frames, a light pattern representing a visible light communication (VLC) signal captured by the camera of or connected to the user device. The method additionally comprises decoding the light pattern into a DRM identifier and controlling distribution of the bitstream or of a bitstream obtained based on the stream of decoded video frames based on a comparison of the DRM identifier and a defined DRM identifier.

Another aspect of the embodiments relates to a video distribution system. The video distribution system is configured to receive, from at least one user device, a bitstream of encoded video frames representing video data captured by a camera of or connected to the user device. The video distribution system is also configured to decode encoded video frames of the bitstream to get a stream of decoded video frames. The video distribution system is further configured to identify, in at least one decoded video frame of the stream of decoded video frames, a light pattern representing a VLC signal captured by the camera of or connected to the user device. The video distribution system is additionally configured to decode the light pattern into a DRM signal. The video distribution system is also configured to control distribution of the bitstream or of a bitstream obtained based on the stream of decoded video frames based on a comparison of the DRM identifier and a defined DRM identifier.

A further aspect of the embodiments relates to a video distribution system comprising a video decoder for decoding, for at least one user device, encoded video frames of a bitstream received from the user device to get a stream of decoded video frames. The bitstream comprises encoded video frames representing video data captured by a camera of or connected to the user device. The video distribution system also comprises a pattern identifier for identifying, in at least one decoded video frame, a light pattern representing a VLC signal captured by the camera of or connected to the user device. The video distribution system further comprises a pattern decoder for decoding the light pattern into a DRM identifier. The video distribution system additionally comprises a distribution controller for controlling distribution of the bitstream or of a bitstream obtained based on the stream of decoded video frames based on a comparison of the DRM identifier and a defined DRM identifier.

Yet another aspect of the embodiments relates to a computer program comprising instructions, which when executed by a processor, cause the processor to decode, for at least one user device, encoded video frames of a bitstream received from the user device to get a stream of decoded video frames. The bitstream comprises encoded video frames representing video data captured by a camera of or connected to the user device. The processor is also caused to identify, in at least one decoded video frame, a light pattern representing a VLC signal captured by the camera of or connected to the user device. The processor is further caused to decode the light pattern into a DRM identifier. The processor is additionally caused to control distribution of the bitstream or of a bitstream obtained based on the stream of decoded video frames based on a comparison of the DRM identifier and a defined DRM identifier.

A related aspect of the embodiments defines a carrier comprising a computer program as defined above. The carrier is one of an electronic signal, an optical signal, an electromagnetic signal, a magnetic signal, an electric signal, a radio signal, a microwave signal, or a computer-readable storage medium.

The present embodiments provide a solution to imposing DRM and copyright protection onto video content uploaded from users recording a social event. The embodiments do not require any modifications of the user devices used by the users to record the social event. The usage of VLC to watermark video content does not significantly degrade the video content. Hence, the user experience, when watching the video content, is not significantly affected.

BRIEF DESCRIPTION OF THE DRAWINGS

The embodiments, together with further objects and advantages thereof, may best be understood by making reference to the following description taken together with the accompanying drawings, in which:

FIG. 3 is a flow chart illustrating an embodiment of the distribution controlling step in the video distribution method shown in FIG. 1;

FIG. 4 is a flow chart illustrating an embodiment of the determining step in the video distribution method shown in FIG. 3;

FIG. 5 is a flow chart illustrating another embodiment of the determining step in the video distribution method shown in FIG. 3;

FIG. 6 is a flow chart illustrating an additional, optional step of the video distribution method shown in FIG. 1 according to an embodiment;

FIG. 7 is a flow chart illustrating another embodiment of the distribution controlling step in the video distribution method shown in FIG. 1;

FIG. 8 is a flow chart illustrating additional, optional steps of the video distribution method shown in FIG. 1 according to an embodiment;

FIG. 9 is a flow chart illustrating additional, optional steps of the video distribution method shown in FIG. 1 according to another embodiment;

FIG. 14 schematically illustrates a block diagram of a video distribution system according to an embodiment;

FIG. 15 schematically illustrates a block diagram of a video distribution system according to another embodiment;

FIG. 16 schematically illustrates a block diagram of a video distribution system according to a further embodiment; and FIG. 17 schematically illustrates a computer program implementation according to an embodiment.

DETAILED DESCRIPTION

Throughout the drawings, the same reference numbers are used for similar or corresponding elements.

The present embodiments generally relate to video distribution, and in particular to controlling video distribution by implementing digital rights management (DRM) to video content obtained from user devices.

The embodiments thereby enable distribution control of video content from user devices, for instance, in connection with a social event, such as a game or concert. The present embodiments can be used to control distribution of potentially DRM or copyright protected video content from a distributing or streaming service provider or server and where the video content is obtained from user devices filming an event and uploading the video content to the distributing or streaming service provider or server.

The user device is preferably in the form of a mobile or portable user device, such a mobile telephone, a smartphone, a tablet, a laptop, a video camera with wireless communication circuitry, etc.

In the following, a video frame is used to denote a picture or image of a video stream. Hence, a video frame could alternatively be denoted (video) picture or (video) image in the art. As is known in the art of video coding, a video frame is encoded according to a video coding standard or specification to get an encoded video frame, such as an intra-coded frame, or I frame or picture, or an inter-coded frame, or P or B frame or picture.

Figure 1:
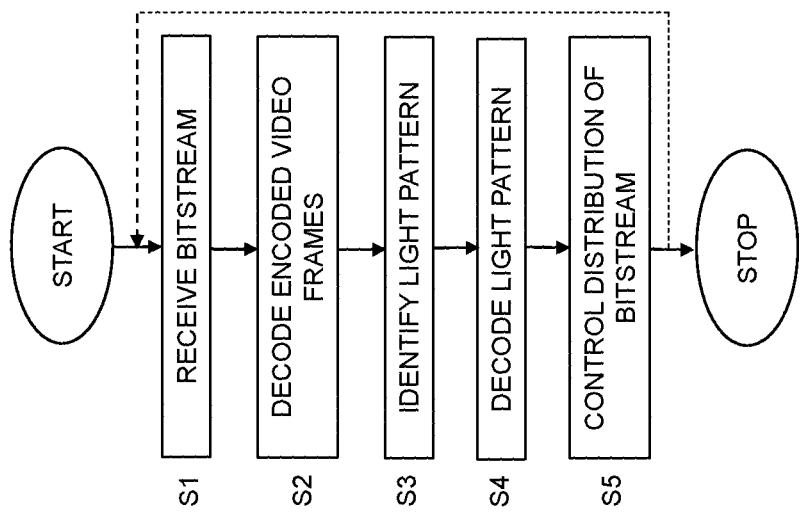
FIG. 1 is a flow chart illustrating a video distribution method according to an embodiment.

FIG. 1 is a flow chart illustrating a video distribution method according to an embodiment. The method starts in step S1, which comprises receiving, from at least one user device, a bitstream of encoded video frames representing video data captured by a camera of or connected to the user device. Encoded video frames of the bitstream are decoded in step S2 to get a stream of decoded video frames. A next step S3 comprises identifying, in at least one decoded video frame of the stream of decoded video frames, a light pattern representing a visible light communication (VLC) signal captured by the camera of or connected to the user device. The light pattern is decoded in step S4 into a DRM identifier. The following step S5 comprises controlling distribution of the bitstream or of a bitstream obtained based on the stream of decoded video frames based on a comparison of the DRM identifier and a defined DRM identifier.

The present embodiments thereby use VLC in order to add watermarks to video frames generated by user devices recording a scene, such as during a social event. The VLC signal will give rise to a light pattern that could be regarded as a watermark present in at least one of the video frames. The light pattern is identified and decoded to get a DRM identifier. This DRM identifier can then be compared to a defined DRM identifier in order to determine whether the bitstream received from the user device or a bitstream created based on, e.g. by encoding, the video frames from the user device may be distributed or not and/or how the distribution may be performed. In other words, VLC signaling is employed in order to encode DRM identifiers into video frames of recorded video content. The DRM identifiers can thereby be used to ensure copyright or digital rights protection and control distribution of the video content.

The hashed line in FIG. 1 schematically indicates that the steps of the video distribution method may be performed on the bitstreams as received from multiple, i.e. at least two, user devices. Hence, the processing in steps S1 to S5 is preferably performed for each bitstream and user device that produces such a bitstream at a given event.

Figure 2:
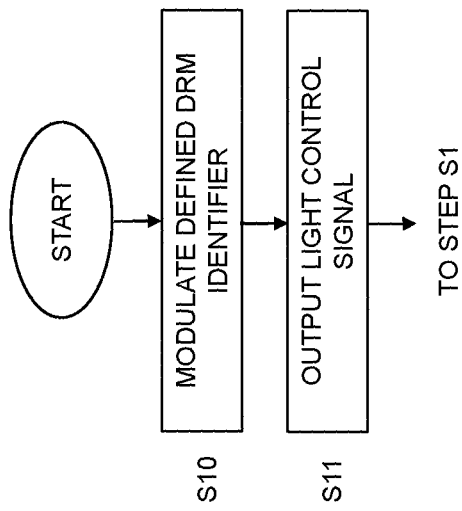
FIG. 2 is a flow chart illustrating additional, optional steps of the video distribution method shown in FIG. 1 according to an embodiment.

In an embodiment, the VLC signal captured by the camera of or connected to the user device is generated based on the defined DRM identifier. FIG. 2 is a flow chart illustrating additional, optional steps of the method shown in FIG. 1 disclosing an embodiment of generating the VLC signal based on the defined DRM identifier.

The method starts in step S10, which comprises modulating the defined DRM identifier with a modulation signal to get a light control signal. The light control signal is output in step S11 to a light controller connected to a VLC-capable light source. The light controller is configured to control the VLC-capable light source according to the light control signal to output a VLC signal.

In this embodiment, a light control signal is generated to control or drive a VLC-capable light source in order to output a VLC signal that is detectable by the cameras of or connected to the user devices. Hence, the cameras will capture the VLC signal while they are recording a scene. The cameras will thereby output at least one video frame comprising a light pattern representing the captured VLC signal. The video frames generated by the cameras are encoded into respective bitstreams that are received and decoded. Respective decoded video frames comprising the light pattern are identified and the light pattern is decoded to get the DRM identifier. The DRM identifier can then be used in order to control distribution of the bitstream as received from the user device or of a bitstream obtained based on the stream of decoded video frames from step S2 in FIG. 1.

The DRM identifier as obtained during the decoding step S4 is thereby compared to the defined DRM identifier that is modulated in step S10 in order to get the light control signal used in step S11 to control the VCL-capable light source to output the VLC signal. If the DRM identifier is equal to the defined DRM identifier then one can determine that the bitstream as received from the user device carries video content recorded during an event or at a scene, at which the VLC signal encoding the defined DRM identifier was output. It is then possible to determine whether any copyright or digital rights exist for that event or scene that would impose restrictions or indeed prevent distribution of the bitstream to any consumers, typically through a distributing or streaming service provider or server.

The modulation signal used to modulate the defined DRM identifier in step S10 of FIG. 2 is preferably a pulse width modulation (PWM) signal. For instance, the defined DRM identifier can be modulated onto a standard PWM signal used to drive commercial and resident light-emitting diode (LED) lightning. The modulated signal can be generated by, for instance, a low-cost micro-controller which drives a commercially available LED light through a metal-oxide-semiconductor field-effect transistor (MOSFET) driver circuit.

The light controller then controls or drives the VLC-capable light source according to the light control signal to output a VLC signal, i.e. to flash a coded signal in lightning with high frequency on-off changes. While the cameras of or connected to the user devices record a scene, such as a social event, the VLC signals are recorded as part of the video streams. The VLC signals can then be detected in the form of a light pattern present in some of the video frames, see FIGS. 13A and 13B.

For instance, assume that a light controller receives a light control signal represented by $10100010_{bin}$. The light controller then controls its connected VLC-capable light source to flash in a pattern according to the light control signal, i.e. on, off, on, off, off, off, on and off in the present example.

The VLC-capable light sources are operated on high frequency with regard to the flashes caused by the light control signal. This rapid flashing is preferably imperceptible to humans, i.e. too high frequency, but is still captured by the cameras of or connected to the user devices.

FIG. 3 is a flow chart illustrating an embodiment of the distribution controlling step in FIG. 1. The method continues from step S4 in FIG. 1. A next step S20 comprises comparing the DRM identifier with the defined DRM identifier. The following step S21 comprises determining whether to distribute the bitstream or the bitstream obtained based on the stream of decoded video frames based on the comparison of the DRM identifier and the defined DRM identifier.

Hence, the comparison as conducted in step S20 is used as a basis in step S21 in order to determine whether to distribute the relevant bitstream.

Distribute as used herein typically involves distributing, such as broadcasting, multicasting or streaming, the bitstream from a distributing or streaming service provider or server to one or more consumers. The bitstream could be distributed as received from the user device through the distributing or streaming service provider or server. Alternatively, the distributing or streaming service provider or server could co-process multiple bitstreams as received from multiple user devices recording a same scene or event. Such co-processing could involve mixing the multiple bitstreams to form a mixed bistream and/or time-aligning the multiple bitstreams so that video frames recorded at the same point in time at the different user devices become time aligned at the distributing or streaming service provider or server before distributing the bitstreams, such as in the form of a time-aligned mixed bitstream, to the consumers. In these cases, the time-aligned and/or mixed bitstream could be obtained by encoding the decoded video frames as obtained in step S2 of FIG. 2 for the respective user devices. Another example of processing is to remove or replace any decoded video frames or parts thereof comprising the light pattern. The remaining decoded video frames are then encoded to get a bitstream that could be distributed to consumers based on the DRM identifier comparison.

FIG. 4 is a flow chart illustrating an embodiment of the determining step in FIG. 3. In this embodiment, the defined DRM identifier (def. DRM ID) indicates that a bitstream carrying video data recorded at an event, during which a VLC signal, as generated based on the defined DRM identifier, is output is allowed to be distributed. The method continues from step S20 in FIG. 3. If the DRM identifier (DRM ID) decoded from the light pattern in step S4 of FIG. 1 is equal to the defined DRM identifier the method continues to step S30. This step S30 comprises making the bitstream or the bitstream obtained based on the stream of decoded video frames available for distribution to consumers. Correspondingly, if the DMR identifier decoded from the light pattern in step S4 is not equal to the defined DRM identifier the method instead continues to step S31. Step S31 comprises preventing distribution of the bitstream or the bitstream obtained based on the stream of decoded video frames to consumers.

In a variant of step S31, distribution of the bitstream is also prevented if the bitstream lacks any video frame that comprises a light pattern obtained when the camera of or connected to a user device captures an output VLC signal.

Hence, in the above described embodiment distribution of bitstreams is only allowed if the bitstream was recorded at an event during which a VLC signal generated based on the defined DRM identifier was output. The defined DRM identifier could thereby be regarded as representing an authorization watermark that guarantees that the bitstream can be distributed to consumers without violating any copyright or digital rights protection.

FIG. 5 is a flow chart illustrating another embodiment of the determining step in FIG. 3. In this embodiment, the defined DRM identifier indicates that a bitstream carrying video data recorded at an event, during which a VLC signal, as generated based on the defined DRM identifier, is output is not allowed to be distributed. The method continues from step S20 in FIG. 3. If the DRM identifier decoded from the light pattern in step S4 of FIG. 1 is not equal to the defined DRM identifier the method continues to step S40. This step S40 comprises making the bitstream or the bitstream obtained based on the stream of decoded video frames available for distribution to consumers. Correspondingly, if the DMR identifier decoded from the light pattern in step S4 is equal to the defined DRM identifier the method instead continues to step S41. Step S41 comprises preventing distribution of the bitstream or the bitstream obtained based on the stream of decoded video frames to consumers.

In a variant of step S40, distribution of the bitstream is also allowed if the bitstream lacks any video frame that comprises a light pattern obtained when the camera of or connected to a user device captures an output VLC signal.

Hence, in the above described embodiment distribution of bitstreams is not allowed if the bitstream was recorded at an event during which a VLC signal generated based on the defined DRM identifier was output. The defined DRM identifier could thereby be regarded as representing a prohibition watermark that indicates that distribution of the bitstream to consumers violates copyright or digital rights protection.

Thus, VLC signal representing the defined DRM identifier can thereby be used either to impose restrictions or indeed prevent distribution of recorded video content or to indicate that distribution is allowed without violating any copyright or digital rights protection.

In the above discussed embodiment, the distribution control performed based on DRM identifiers involve either allowing distribution or preventing distribution. In other embodiments, the distribution control may comprise other forms of distribution control, such as restricting distribution of the bitstream. A restriction could be imposed to the distribution by, for instance, limiting the period of time during which the bitstream is available for distribution, limiting the audience, i.e. the consumers that are allowed to receive the bitstream, limiting the quality of the bitstream, such as up to but not above a defined quality of service level, adding commercials to the bitstream, etc. In such a case, no such limitations or restrictions are preferably imposed in step S30 of FIG. 4 or step S40 of FIG. 5, whereas they are preferably imposed in step S31 of FIG. 4 or step S41 of FIG. 5.

Hence, the control of distribution does not necessarily have to be on vs. off but also other variants of controlling distribution are possible and within the scope of the embodiments.

Allowing distribution could be in the form of allowing forwarding the bitstream from a distributing or streaming service provider or server to consumers, such as by not transmitting any control signal from a video distribution system to the distributing or streaming service provider or server or by transmitting a control signal to the distributing or streaming service provider or server indicating that distribution of the bitstream is allowed. Correspondingly, preventing distribution could be in the form of preventing forwarding the bitstream from the distributing or streaming service provider or server to consumers, such as by transmitting any control signal from the video distribution system to the distributing or streaming service provider or server indicating that distribution is not allowed.

The video distribution system of the embodiments could be integrated with and implemented at a distributing or streaming service provider or server or could be implemented separated from the distributing or streaming service provider or server.

The conditional distribution of the video content of the embodiments could be based on not only DRM identifiers as signaled using VLC but also based on user subscriptions or agreements. Hence, it could be possible that a bitstream recorded by certain users at a given event are, through a subscription or agreement of the user, allowed to be distributed to consumers through a distributing or streaming service provider or sever. However, bitstreams recorded at the given event by other users that do not have the relevant subscription or agreement are not allowed to be distributed by the distributing or streaming service provider or server to consumers. FIGS. 6 and 7 are flow chart illustrating additional, optional steps handling such situations.

The method continues from step S1 in FIG. 1 to step S50 in FIG. 6. Step S50 comprises receiving a user identifier associated with the at least one user device. The method then continues to step S2 in FIG. 1. Step S5 of FIG. 1 comprises, in this embodiment, controlling distribution of the bitstream or of the bitstream obtained based on the stream of decoded video frames based on the comparison of the DRM identifier and the defined DRM identifier and based on the user identifier.

The user identifier could be any identifier allowing identification of the user device and/or of the user of the user device. Non-limiting examples include serial number of the user device, international mobile subscriber identity (IMSI), social media identifier, user name of the user at the distributing or streaming service provider or server, etc.

FIG. 7 is a flow chart illustrating an embodiment of the controlling step in FIG. 1 when using user identifiers in addition to the DRM identifier comparison in the distribution control. The method continues for step S4 in FIG. 1. A next step S60 comprises comparing the DRM identifier with the defined DRM identifier. This step S60 corresponds to step S20 in FIG. 3. The method also comprises comparing the user identifier with any user identifier in a set of at least one authorized user identifier in step S61. Steps S60 and S61 can be performed serially in any order or indeed at least partly in parallel. The following step S62 comprises determining whether to distribute the bitstream or the bitstream obtained based on the stream of decoded video frames based on the comparison of the DRM identifier and the defined DRM identifier and based on whether the user identifier is present in the set of at least one authorized user identifier.

In this embodiment, the decision whether to allow distribution of the bitstream or not in step S62 is made based on the comparisons performed in steps S60 and S61. In a particular embodiment, the set mentioned above could be regarded as a list of user identifiers associated with authorized users, i.e. users that are allowed to distribute recorded video content to consumers via a distributing or streaming service provider or server. This means that if the user identifier as received in step S50 of FIG. 6 is present in the set of at least one authorized user identifier the user of the user device is regarded as an authorized user that can distribute his/her recorded video content if the DRM identifier comparison indicates that distribution is allowed.

In a particular embodiment, step S62 is performed as shown in FIG. 4 but with the addition of the additional check with user identifiers. Hence, if the DRM identifier obtained in step S4 of FIG. 1 is equal to the defined DRM identifier and if the user identifier received in step S50 of FIG. 6 is present in the set of at least one authorized user identifier the method continues to step S30. Thus, the bitstream is made available for distribution. However, if the DRM identifier obtained in step S4 is not equal to the defined DRM identifier and/or if the user identifier received in step S50 is not present in the set of at least one authorized user identifier the method continues to step S31. Thus, the bitstream is prevented from being distributed to consumers.

In another embodiment, distribution of the bitstream could be differentiated based on the user identifier, i.e. whether it belongs to the set of authorized user identifiers or not, as long as the DRM identifier is equal to the defined DRM identifier. For instance, a bitstream from an authorized user (user identifier is present in set of at least one authorized identifier) could be freely distributed to consumers by a distributing or streaming service provider or server as long as the DRM identifier is equal to the defined DRM identifier. However, restrictions could be put on the distribution of a bitstream from a non-authorized user (user identifier not present in the set of at least one authorized user identifier) if the DRM identifier is equal to the defined DRM identifier. If the DRM identifier is not equal to the defined DRM identifier distribution is prohibited regardless of whether the user is authorized or not in this embodiment. Restrictions could involve distributing the bitstream for a limited period of time, to a limited audience or group of consumers, allowing distribution of the bitstream up to but not above a threshold quality of service (QoS) level, inserting ads or commercials in the bitstream, etc.

In another embodiment, a bitstream received from an authorized user (user identifier is present in set of at least one authorized identifier) is allowed to be distributed by a distributing or streaming service provider or server regardless of whether the DRM identifier is equal to the defined DRM identifier or not. However, a bitstream from a non-authorized user (user identifier not present in the set of at least one authorized user identifier) is only allowed to be distributed by a distributing or streaming service provider or server if the DRM identifier is equal to the defined DRM identifier.

As was mentioned in the foregoing the rapid flashing of the VLC signal is preferably imperceptible to humans but is still captured by the cameras of or connected to the user devices. However, in some situations there might be a degradation in quality due to the light pattern present in some of the video frames when the cameras capture the VLC signal. In such a case, selective processing of those video frames that comprise the light patterns can be performed as is further disclosed in FIGS. 8 and 9.

FIG. 8 is a flow chart illustrating additional, optional steps of the method in FIG. 1. The method continues from step S4 in FIG. 1. A next step S70 comprises identifying at least one decoded video frame comprising the light pattern that represents the VLC signal captured by the camera of or connected to the user device. The identified at least one decoded video frame is then removed in step S71 from the stream of decoded video frames. The following step S73 comprises encoding video frames of the stream of decoded video frames into encoded video frames. The method then continues to step S5. In this embodiment, control of distribution preferably applies to the bitstream obtained by encoding the decoded video frames in step S73.

FIG. 9 is a flow chart illustrating an alternative embodiment to removing video frames. The method continues from step S4 in FIG. 1 to step S70. This step S70 is performed as described above in connection with FIG. 8. A next step S72 comprises replacing at least a portion of the identified at least one decoded video frame with at least a portion of a neighboring decoded video frame lacking the light pattern of the stream of decoded video frames. The method then continues to step S73 that is performed as described above in connection with FIG. 8.

Thus, in this embodiment a video frame comprising the potentially disturbing light pattern may be replaced completely or partly with a neighboring video frame present in the same stream of decoded video frames and where this neighboring video frame does not comprise the light pattern. Neighboring video frame as used herein preferably refers to neighboring with regard to output order, which may be different from the decoding and encoding order of the video frames. Thus, if video frame number h in a given stream comprises a light pattern, then this video frame may be replaced by video frame number h−1 in the give stream, where the numbering of video frames is according to the output order.

Neighboring video frame, thus, preferably corresponds to the immediate adjacent video frame in the stream, i.e. video frame number h−1 is a neighboring video frame for video frame number h. Neighboring video frame could also correspond to video frame number h+1 or indeed h±q, wherein q is a defined integer value, preferably q=1, 2 or 3.

Generally, there is hardly no perceivable quality deterioration by replacing a video frame with a neighboring video frame in the stream.

The complete video frame identified in step S70 could be replaced by the neighboring video frame in step S72 according to an embodiment. In another embodiment, merely a portion of the identified video frame is replaced by a corresponding portion in the neighboring video frame. Corresponding portion preferably corresponds to a portion that occupies the same area or part in the neighboring video frame as the portion occupies in the identified video frame. Generally, a video frame comprises one or more slices, which may be regarded as independently codable and decodable parts of a video frame. Replacing a portion of the identified video frame in step S72 then preferably comprises replacing the slice or slices that comprise the light pattern or portions thereof in the identified video frame.

Replacing the identified at least one video frame or a portion thereof in step S72 can be performed according to different embodiments. For instance, the replaced video frame or portion could be encoded according to the so-called skip mode or the merge mode of, for instance, H.264 or H.265 video coding standards using the neighboring video frame as reference frame.

If the VLC signal is transmitted faster than a conventional threshold, i.e. 100 Hz, then the VLC transmission would not be detected by the human eye. Therefore, the audience is not aware of such VLC transmission whereas digital cameras are able to detect and record the VLC signal. This way the quality of the performance and the existing ambient light is not affected at all.

Although there is a tradeoff between system accuracy and quality of the recorded video content, if the VLC transmission period is shorter than a certain amount of time and the transmission intervals are long enough, the quality of the captured video data would not be degraded by any distortion. The VLC transmission period (depending on the defined bit rate of the transmission) can be as short as half of a life time of a video frame. A life time of a video frame in a common 30 frames per second (fps) recording device is near 33 milliseconds, this makes the half-life of a frame roughly 16 milliseconds. By setting the VLC transmission intervals as e.g. every 20 seconds, a bitstream with a playtime of 20 seconds may contain only 16 milliseconds of watermarked information. This short portion of data transmission is too small to be noticed in a playback and does not constitute more than 0.08% of the whole playtime An advantage of the embodiments is to provide real-time watermark detection in live video and bitstreams without degrading the QoS. This is possible since the VLC-based watermarking does not distort the whole video content. In clear contrast, the life time of the watermark can be made as short as a portion of one video frame. The impact of such watermarking can be measured by the equation below:

$$QoS = \frac{t \times a}{F_{ps} \times T}$$

wherein t is the life-time of a video frame in milliseconds, a is the portion of a video frame that becomes watermarked (value between 0 and 1), $F_{ps}$ is the frame rate of the video in fps and T is the time between each two watermarks, i.e. the period of VLC signal transmission in milliseconds. For example, if a VLC-induced watermark, i.e. light pattern, occupies half of a video frame the value a is 0.5. $F_{ps}$ is usually 30 fps for most commercial cameras, which makes t approximately 33 ms. If a VLC signal is transmitted every 5 s then the value of T is 5000. In this scenario, the dedicated time for a watermark is only 0.01% of the whole playtime.

In an embodiment, the method also comprises measuring a noise floor of transmission of the bitstream for the at least one user device. A frequency of the light pattern in the image frequency domain is detected based on the measurements. In this embodiment, decoding the light pattern is performed based on information of the frequency of the light pattern.

Thus, the noise floor of each transmission from the user device is measured in order to detect the frequency of the light pattern in the image frequency domain and thereby infer the frequency of the pulsing VLC signal. Once the light pattern is found it can be decoded to get the DRM identifier.

In practice, a frame may contain multiple frequencies. The combination of different frequencies can represent meaningful symbols. A series of such symbols, thus, represents a DRM identifier.

More information of detecting frequency of light pattern and decoding of light pattern into a DRM identifier can be found in section IV. Visual Light Communication on pages 252-254 in Rajagopal et al., Visual Light Landmarks for Mobile Devices, IPSN '14 Proceedings of the 13th international symposium on Information processing in sensor networks, pages 249-260, the teachings of which is hereby incorporated as a reference example of how to generate DRM identifiers and light control signals and how to detect and decode light patterns to obtain DRM identifiers.

There is a need for a technology that enables copyright or digital rights protection in live video broadcasting environments without degradation of user experiences. Embodiments as disclosed herein use VLC-based watermarking on live broadcasting streams to achieve such copyright or digital rights protection.

Figure 10:
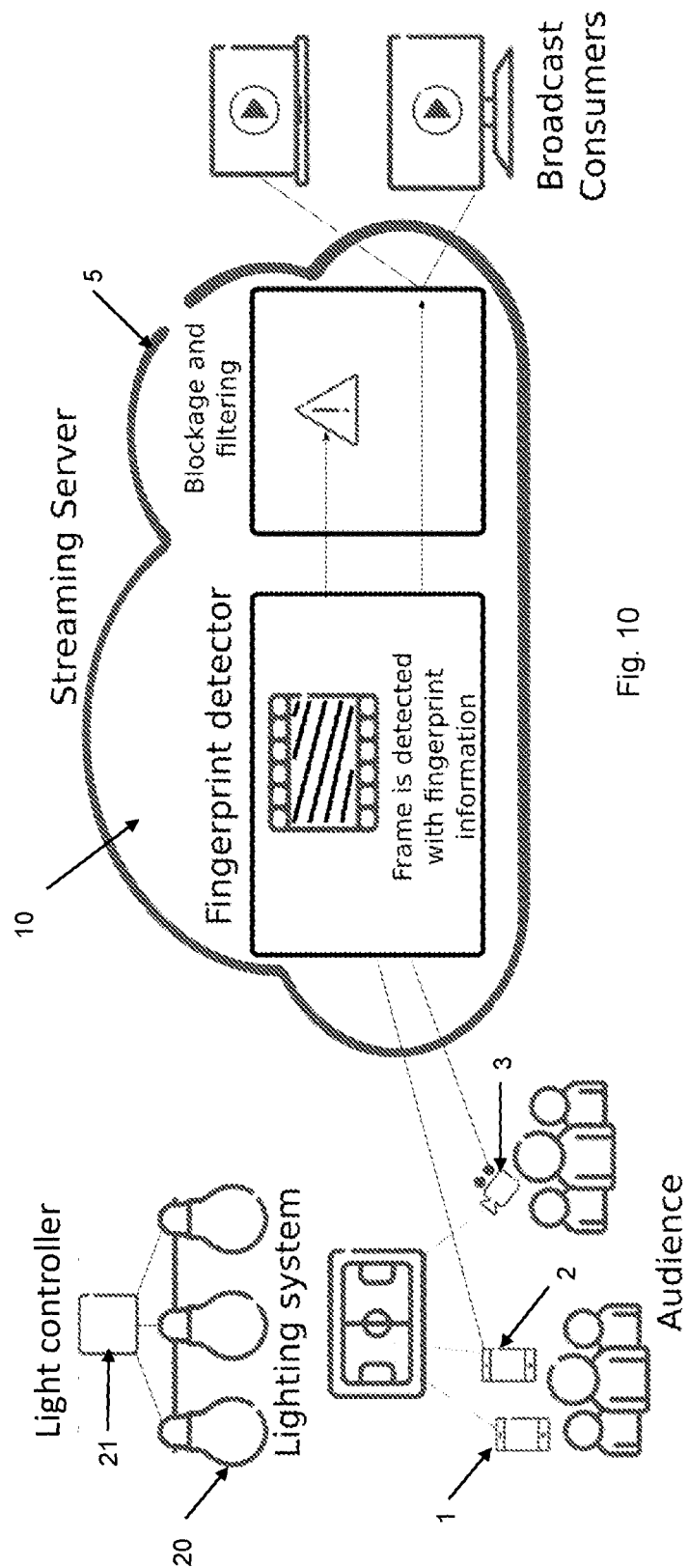
FIG. 10 schematically illustrates an overview of user devices and a video distribution system.

VLC is a data communication medium using visible light from lightening facility for data transmission with very low cost since there is no need to change lightening, e.g. LED, but only the power source. As illustrated in FIG. 10, an event organizer can set preference of, e.g. whether the event is allowed to be recorded and whether or how such recorded bitstreams may be distributed before the event. If it is decided to enable copyright protection, the event organizer can use the present embodiments to embed unique event identity, i.e. DRM identifier, into on-site lightening at a controllable interval, with unnoticeable time span. Then, the audiences record the VLC signals along with video streams. While the video content is uploaded to a streaming server 10 of a live broadcasting service provider, the video content is examined before live broadcasting. If the video content is protected, the channel should be banned.

The present embodiments have several advantages over prior art solutions trying to impose DRM to video content by watermarking. These advantages include:

1) real-time watermarking based on VLC for live broadcasting services;
2) lightweight copyright violation detection;
3) real-time copyright protection without user experience degradation;
4) no human intervention is needed;
5) help live broadcasting service providers to avoid unnecessary copyright disputes or law suits;
6) no expensive change or new hardware is required at the user devices.

The present embodiments are advantageously applicable to controlling distribution of video content recorded at live events, such as sporting events or music concerts. This is done by providing a hand-shaking or policy-based protocol between the broadcasters and streaming servers before the detection process takes place. At the broadcast time different decisions could be made based on these policies. This means that the distribution restrictions could be applied in real-time, for instance in a cloud environment, through categorizing the users, meaning that some users might have the allowance for distribution of the source, e.g. those who have purchased a golden version of the subscription. This is needful for live stream broadcasters to be able to take action in real-time. In this way, a real-time content protection or distribution control could take place, while the quality of the recorded media is preserved.

The VLC-based watermarking can be enabled by the host of the event through the existing lighting system. The detection mechanism is implemented in a video distribution system 10, represented by a streaming server 10 in FIG. 10. This process basically comnprises of the following steps:

1. Receiving a bistream recorded by user devices 1, 2, 3 in the audience.
2. Decoding the incoming bitstream into separate video frames.
3. Perform the detection process by applying common image processing techniques. These techniques can include conversion between formats, fast forward Fourier transform (FFT) and filtering. These computations are not too intensive and can be performed by general processing units (GPUs), optionally in parallel when more acceleration is needed.
4. Meanwhile the bitstream is being broadcast to consumers.
5. Upon detection of watermarked data, the streaming server 10 can act by copyright regulations, e.g. banning the user and stopping the distribution of the bitstream.

The watermarking information, i.e. the defined DRM identifier, can be sent to the streaming server 10 in the meantime or it can be settled before the event starts.

FIG. 10 also illustrates a light controller 21 connected to a VLC-capable light source 20 and configured to control the VLC-capable light source 20 according to the light control signal to output a VLC signal that is recorded by cameras of or connected to the user devices 1, 2, 3 while they are recording a scene or event.

Figure 11:
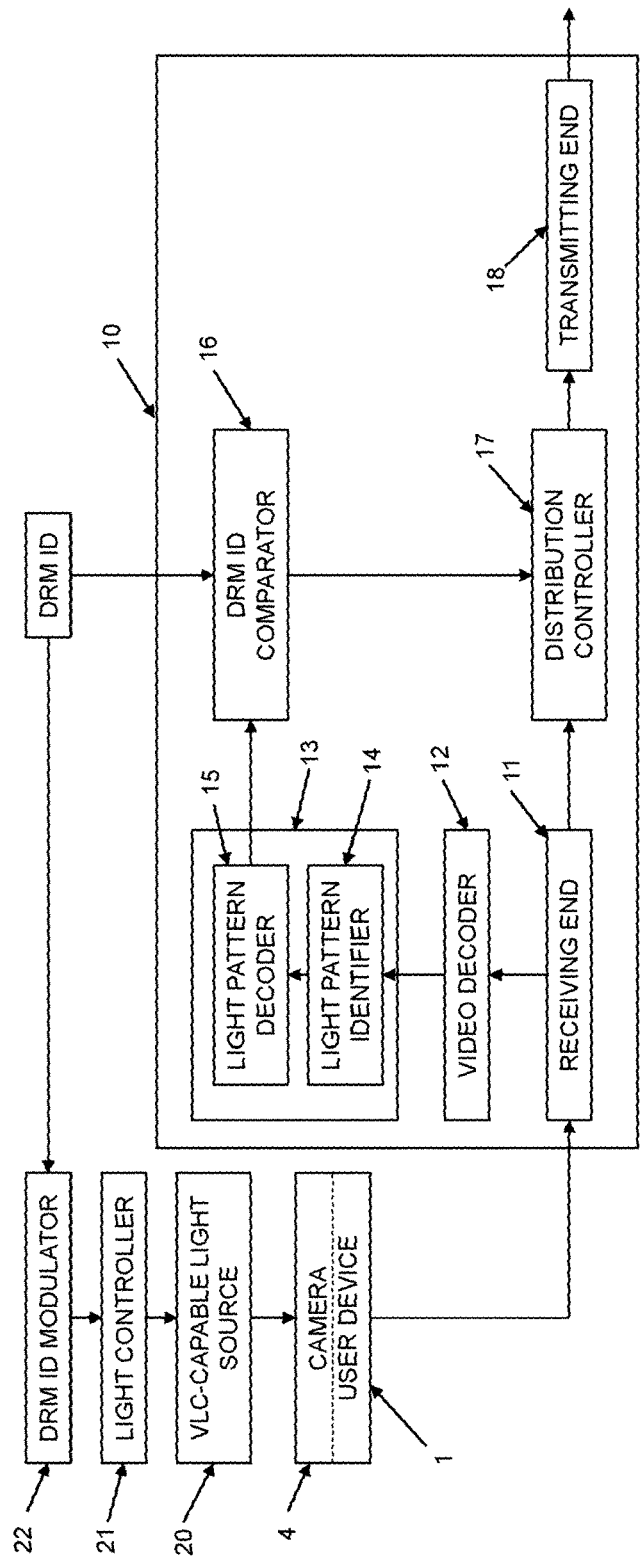
FIG. 11 illustrates in more detail the operation flow between a user device and a video distribution system according to an embodiment.

FIG. 11 illustrates in more detail the operation flow between a user device 1 and a video distribution system 10 according to an embodiment. The defined DRM identifier is modulated at a DRM identifier modulator 22 with a modulation signal to get the light control signal. A light controller 21 controls a VLC-capable light source 20 according to the light control signal to output a VLC signal. The VLC signal is detected by a camera 4 of or connected to the user device 1 while the user is recording an event or scene. The user device 1 encodes the recorded video data including the VLC signal into a bitstream of encoded video frames that is uploaded to the video distribution system 10. The bitstream is received at a receiving end 11 representing a general receiver or input functionality. The bitstream is forwarded to a video decoder 12 that decodes encoded video frames of the bitstream into a stream of decoded video frames. A fingerprint or watermark detector or image processing engine 13 is represented as comprising a light pattern identifier 14 that identifies a light pattern representing the VLC signal in at least one of the decoded video frames. A light pattern decoder 15 of the fingerprint or watermark detector or image processing engine 13 decodes the light pattern into a DRM identifier. The DRM identifier is forwarded to a DRM identifier comparator 16 that additionally has access to the defined DRM identifier used to generate the VLC signal. The DRM identifier comparator 16 compares the DRM identifier and the defined DRM identifier and outputs a control signal generated based on the comparison. This control signal is received by a distribution controller 17 that controls forwarding of the bitstream from the receiving end 11 to a transmitting end 18 for transmission to consumers. Hence, the distribution controller 17 is controlled by the control signal to either allow transmission of the bitstream from the receiving end 11 to the transmitting end 18 and further to consumers or prevent transmission of the bitstream.

Figure 12:
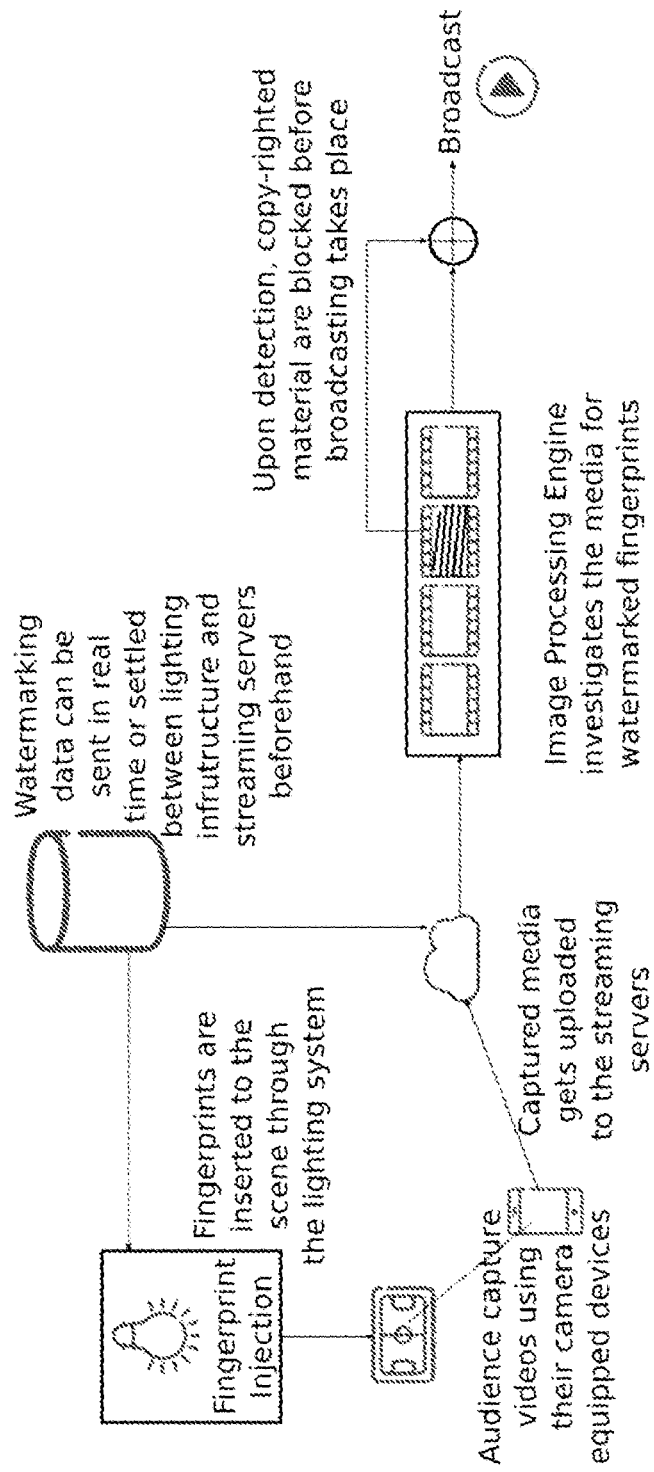
FIG. 12 schematically illustrates the operation flow according to an embodiment of the video distribution method.

FIG. 12 illustrates the operation flow according to an embodiment, such as performed at the video distribution system 10 of FIG. 11.

Figure 13A:
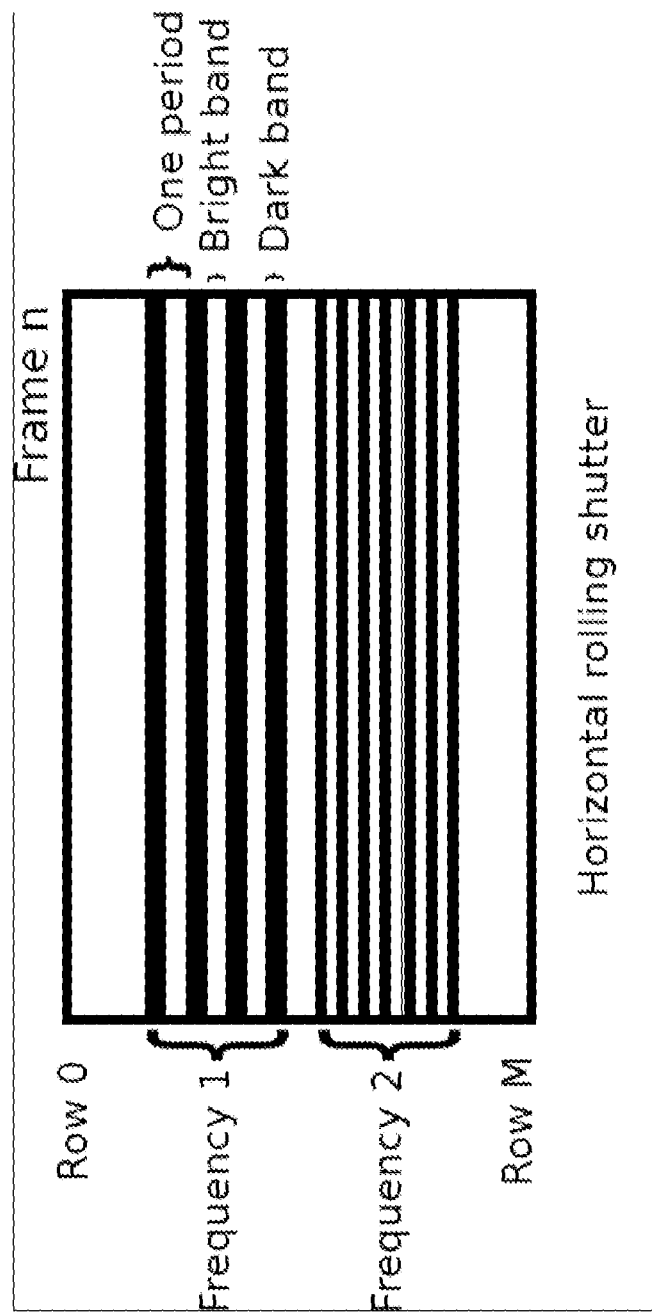
FIGS. 13A and 13B schematically illustrates examples of a light pattern in a video frame.
Figure 13B:
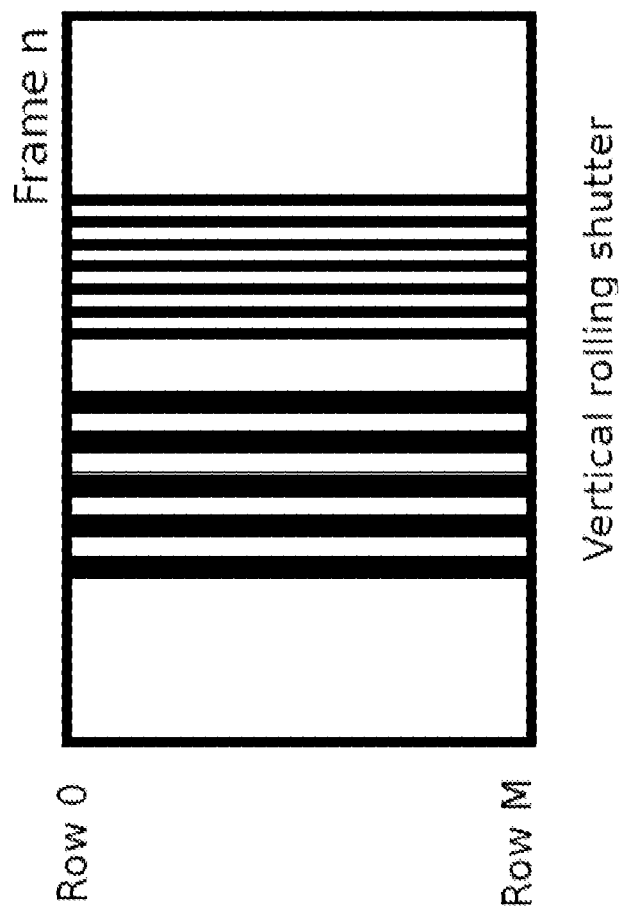

FIGS. 13A and 13B schematically illustrates examples of a light pattern present in a video frame. Many cameras used in smartphones, tables and consumer computer peripherals use complementary metal-oxide-semiconductor (CMOS) sensors and are therefore CMOS rolling shutter cameras. Rolling shutters consecutively expose and read-out individual rows or columns of pixels in a pipelined fashion. As can be seen in FIG. 13A a light source pulsed at a period that is less than the frame duration will produce bright and dark bands coinciding with rows exposed during the on-time and off-time of the light source. The duty-cycle of the light source PWM signal determines the ratio of the height between the bright and dark bands. FIG. 13A illustrates the concept with a horizontal rolling shutter and illustrates a light pattern with two different frequencies. FIG. 13B illustrates the corresponding situation but with a vertical rolling shutter.

Another aspect of the embodiments relates to a video distribution system. The video distribution system is configured to receive, from at least one user device, a bitstream of encoded video frames representing video data captured by a camera of or connected to the user device. The video distribution system is also configured to decode encoded video frames of the bitstream to get a stream of decoded video frames. The video distribution system is further configured to identify, in at least one decoded video frame of the stream of decoded video frames, a light pattern representing a VLC signal captured by the camera of or connected to the user device. The video distribution system is additionally configured to decode the light pattern into a DRM signal. The video distribution system is also configured to control distribution of the bitstream or of a bitstream obtained based on the stream of decoded video frames based on a comparison of the DRM identifier and a defined DRM identifier.

In an embodiment, the video distribution system is configured to modulate the defined DRM identifier with a modulation signal to get a light control signal. The video distribution system is also configured to output the light control signal to a light controller connected to a VLC-capable light source and configured to control the VLC-capable light source according to the light control signal to output a VLC signal.

In an embodiment, the video distribution system is configured to compare the DRM identifier with the defined DRM identifier. The video distribution system is also configured to determine whether to distribute the bitstream or the bitstream obtained based on the stream of decoded video frames based on the comparison of the DRM identifier and the defined DRM identifier.

In a particular embodiment, the video distribution system is configured to make the bitstream or the bitstream obtained based on the stream of decoded video frames available for distribution to consumers if the DRM identifier is equal to the defined DRM identifier. The video distribution system is also configured to prevent distribution of the bitstream or of the bitstream obtained based on the stream of decoded video frames to consumers if the DRM identifier is not equal to the defined DRM identifier.

In another particular embodiment, the video distribution system is configured to make the bitstream or the bitstream obtained based on the stream of decoded video frames available for distribution to consumers if the DRM identifier is not equal to the defined DRM identifier. The video distribution system is also configured to prevent distribution of the bitstream or of the bitstream obtained based on the stream of decoded video frames to consumers if the DRM identifier is equal to the defined DRM identifier.

In an embodiment, the video distribution system is configured to receive a user identifier associated with the at least one user device. The video distribution system is also configured to control distribution of the bitstream or of the bitstream obtained based on the stream of decoded video frames based on the comparison of the DRM identifier and the defined DRM identifier and based on the user identifier.

In a particular embodiment, the video distribution system is configured to compare the DRM identifier with the defined DRM identifier. The video distribution system is also configured to compare the user identifier with any user identifier in a set of at least one authorized user identifier. The video distribution system is further configured to determine whether to distribute the bitstream or the bitstream obtained based stream of decoded video frames based on the comparison of the DRM identifier and the defined DRM identifier and based on whether the user identifier is present in the set of at least one authorized user identifier.

In an embodiment, the video distribution system is configured to identify at least one decoded video frame comprising the light pattern. The video distribution system is also configured to remove the identified at least one decoded video frame from the stream of decoded video frames. The video distribution system is further configured to encode decoded video frames of the stream of decoded frames into encoded video frames.

In an embodiment, the video distribution system is configured to identify at least one decoded video frame comprising the light pattern. The video distribution system is also configured to replace at least a portion of the identified at least one decoded video frame with at least a portion of a neighboring decoded video frame lacking the light pattern of the stream of decoded video frames. The video distribution system is further configured to encode decoded video frames of the stream of decoded frames into encoded video frames.

The video distribution system could be a backend server capable of communicating with user devices. The video distribution system could alternatively be implemented as a group or cluster of multiple, i.e. at least two, backend servers that are interconnected by wired or wireless connections. The multiple backend servers could be locally arranged at distributing or streaming service provider or be distributed among multiple locations. Also cloud-based implementations of the video distribution system are possible and within the scope of the embodiments.

It will be appreciated that the methods and systems described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

FIG. 14 illustrates a particular hardware implementation of the video distribution system 100. In an embodiment, the video distribution system 100 comprises a receiver 101 configured to receive the bitstream from the at least one user device. A video decoder 102 of the video distribution system 100 is configured to decode the encoded video frames and a pattern decoder 103 is configured to decode the light pattern. The video distribution system 100 additionally comprises a distribution controller 104 configured to control distribution of the bitstream based on the comparison of the DRM identifier and the defined DRM identifier.

In an embodiment, the video distribution system 100 also comprises a modulator 105 configured to modulate the defined DRM identifier with the modulation signal. The video synchronization system 100 may also comprise a transmitter 106 configured to output the light control signal to the light controller.

The optional modulator 105 is preferably connected to the optional transmitter 106 to forward the light control signal thereto. The receiver 101 is preferably connected to the video decoder 102 to forward the encoded video frames of the bitstreams to the video decoder 102. The video decoder 102 is in turn connected to the pattern decoder 103 in order to forward the decoded video frames thereto. The pattern decoder 103 is connected to the distribution controller 104 in order to transmit information of the DRM identifier thereto.

Alternatively, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular example, the video distribution system 110, see FIG. 15, comprises a processor 111 and a memory 112 comprising instructions executable by the processor 111. The processor 111 is operative to decode the encoded video frames from the at least one user device. The processor 111 is also operative to identify the light pattern in the at least one decoded video frame and decode the light pattern. The processor 111 is further operative to control distribution of the bitstream based on the comparison of the DRM identifier and the defined DRM identifier.

In an embodiment, the processor 11 is also operative to modulate the defined DRM identifier with the modulation signal. The processor 111 is further operative to output the light control signal for transmission to the light controller.

In a particular embodiment, the processor 111 is operative, when executing the instructions stored in the memory 112, to perform the above described operations. The processor 111 is thereby interconnected to the memory 112 to enable normal software execution.

The video distribution system 110 may furthermore comprise a transmitter 114 configured to transmit the light control signal to the light controller and a receiver 113 configured to receive the bitstream from the user device.

FIG. 17 is a schematic block diagram illustrating an example of a video distribution system 200 comprising a processor 210, an associated memory 220 and a communication circuitry 230.

In this particular example, at least some of the steps, functions, procedures, modules and/or blocks described herein are implemented in a computer program 240, which is loaded into the memory 220 for execution by processing circuitry including one or more processors 210. The processor 210 and memory 220 are interconnected to each other to enable normal software execution. A communication circuitry 230 is also interconnected to the processor 210 and/or the memory 220 to enable input and/or output of the light control signals and the bitstreams.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

In an embodiment, the computer program 240 comprises instructions, which when executed by the processor 210, cause the processor 210 to decode, for at least one user device, encoded video frames of a bitstream received from the user device to get a stream of decoded video frames. The bitstream comprises encoded video frames representing video data captured by a camera of or connected to the user device. The processor 210 is also caused to identify, in at least one decoded video frame, a light pattern representing a VLC signal captured by the camera of or connected to the user device. The processor 210 is further caused to decode the light pattern into a DRM identifier. The processor 210 is additionally caused to control distribution of the bitstream or of a bitstream obtained based on the stream of decoded video frames based on a comparison of the DRM identifier and a defined DRM identifier.

In an embodiment, the processor 210 is also caused to modulate the defined DRM identifier with a modulation signal to get a light control signal. The processor 210 is further caused to output the light control signal for transmission to a light controller connected to a VLC-capable light source and configured to control the VLC-capable light source according to the light control signal to output a VLC signal.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium 250.

By way of example, the software or computer program 240 may be realized as a computer program product, which is normally carried or stored on a computer-readable medium 250, preferably non-volatile computer-readable storage medium 250. The computer-readable medium 250 may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a computer or equivalent processing device, represented by the video distribution system 200 in FIG. 17, for execution by the processor 210 thereof.

The flow diagram or diagrams presented herein may therefore be regarded as a computer flow diagram or diagrams, when performed by one or more processors. A corresponding video distribution system may be defined as a group of function modules, where each step performed by the processor corresponds to a function module. In this case, the function modules are implemented as a computer program running on the processor. Hence, the video distribution system may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 16 illustrating a schematic block diagram of a video distribution system 120 with function modules. The video distribution system 120 comprises a video decoder 121 for decoding, for at least one user device, encoded video frames of a bitstream received from the user device to get a stream of decoded video frames. The bitstream comprises encoded video frames representing video data captured by a camera of or connected to the user device. The video distribution system 120 also comprises a pattern identifier 122 for identifying, in at least one decoded video frame, a light pattern representing a VLC signal captured by the camera of or connected to the user device. The video distribution system 120 further comprises a pattern decoder 123 for decoding the light pattern into a DRM identifier. The video distribution system 120 additionally comprises a distribution controller 124 for controlling distribution of the bitstream or of a bitstream obtained based on the stream of decoded video frames based on a comparison of the DRM identifier and a defined DRM identifier.

In an embodiment, the video distribution system 120 also comprises a modulator 125 for modulating the defined DRM identifier with a modulation signal to get a light control signal. The video distribution system 120 further comprises an output unit 126 for outputting the light control signal for transmission to a light controller connected to a VLC-capable light source and configured to control the VLC-capable light source according to the light control signal to output a VLC signal.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A video distribution method comprising:
   receiving, from at least one user device, a bitstream of encoded video frames representing video data captured by a camera of or connected to said user device, wherein receiving comprises receiving at a video distribution system;
   decoding encoded video frames of said bitstream to get a stream of decoded video frames;
   identifying, in at least one decoded video frame of said stream of decoded video frames, a light pattern representing a visible light communication, VLC, signal captured by said camera of or connected to said user device;
   decoding said light pattern into a digital rights management, DRM, identifier; and
   controlling distribution of said bitstream or of a bitstream obtained based on said stream of decoded video frames based on a comparison of said DRM identifier and a defined DRM identifier, wherein controlling said distribution comprises,
      comparing said DRM identifier with said defined DRM identifier, and
      determining whether to distribute said bitstream or said bitstream obtained based on said stream of decoded video frames based on said comparison of said DRM identifier and said defined DRM identifier; wherein determining whether to distribute said bitstream comprises,
      making said bitstream or said bitstream obtained based on said stream of decoded video frames available for distribution from the video distribution system to consumers responsive to a first outcome of comparing said DRM identifier and said defined DRM identifier, and
      preventing distribution of said bitstream or of said bitstream obtained based on said stream of decoded video frames from the video distribution system to consumers responsive to a second outcome of comparing said DRM identifier and said defined DRM identifier, the second outcome being different than the first outcome.

2. The video distribution method according to claim 1, wherein said VLC signal is generated based on said defined DRM identifier.

3. The video distribution method according to claim 1, further comprising:
   modulating said defined DRM identifier with a modulation signal to get a light control signal; and
   outputting said light control signal to a light controller connected to a VLC-capable light source and configured to control said VLC-capable light source according to said light control signal to output a VLC signal.

4. The video distribution method according to claim 1, wherein the first outcome comprises said DRM identifier being equal to said defined DRM identifier, and wherein the second outcome comprises said DRM identifier being not equal to said defined DRM identifier.

5. The video distribution method according to claim 1, wherein the first outcome comprises said DRM identifier being not equal to said defined DRM identifier, and wherein the second outcome comprises said DRM identifier being equal to said defined DRM identifier.

6. The video distribution method according to claim 1, further comprising receiving a user identifier associated with said at least one user device, wherein controlling distribution comprises controlling distribution of said bitstream or of said bitstream obtained based on said stream of decoded video frames based on said comparison of said DRM identifier and said defined DRM identifier and based on said user identifier.

7. The video distribution method according to claim 6, wherein controlling said distribution comprises:
   comparing said user identifier with any user identifier in a set of at least one authorized user identifier; and
   determining whether to distribute said bitstream or said bitstream obtained based on said stream of decoded video frames based on said comparison of said DRM identifier and said defined DRM identifier and based on whether said user identifier is present in said set of at least one authorized user identifier.

8. The video distribution method according to claim 1, wherein controlling distribution comprises:
   identifying at least one decoded video frame comprising said light pattern;
   removing said identified at least one decoded video frame from said stream of decoded video frames; and
   generating said bitstream by encoding decoded video frames of said stream of decoded video frames into encoded video frames without said identified at least one decoded video frame.

9. The video distribution method according to claim 1, wherein controlling distribution comprises:
   identifying at least one decoded video frame comprising said light pattern;
   replacing at least a portion of said identified at least one decoded video frame with at least a portion of a neighboring decoded video frame lacking said light pattern of said stream of decoded video frames; and
   generating said bitstream by encoding decoded video frames of said stream of decoded video frames into encoded video frames without said identified at least one decoded video frame.

10. A video distribution system comprising:
    a processor; and
    a memory comprising instructions executable by said processor, wherein said processor is operative to:
    receive, from at least one user device, a bitstream of encoded video frames representing video data captured by a camera of or connected to said user device, wherein receiving comprises receiving at the video distribution system;
    decode encoded video frames of said bitstream to get a stream of decoded video frames;
    identify, in at least one decoded video frame of said stream of decoded video frames, a light pattern representing a visible light communication, VLC, signal captured by said camera of or connected to said user device;
    decode said light pattern into a digital rights management, DRM, identifier; and
    control distribution of said bitstream or of a bitstream obtained based on said stream of decoded video frames based on a comparison of said DRM identifier and a defined DRM identifier, wherein controlling said distribution comprises,
       comparing said DRM identifier with said defined DRM identifier, and
       determining whether to distribute said bitstream or said bitstream obtained based on said stream of decoded video frames based on said comparison of said DRM identifier and said defined DRM identifier; wherein determining whether to distribute said bitstream comprises,
    making said bitstream or said bitstream obtained based on said stream of decoded video frames available for distribution from the video distribution system to consumers responsive to a first outcome of comparing said DRM identifier and said defined DRM identifier, and
    preventing distribution of said bitstream or of said bitstream obtained based on said stream of decoded video frames from the video distribution system to consumers responsive to a second outcome of comparing said DRM identifier and said defined DRM identifier, the second outcome being different than the first outcome;
wherein the video distribution system further comprises a receiver coupled with the processor, wherein the processor is operative to receive the bitstream through the receiver.

11. The video distribution system according to claim 10, wherein said processor is further operative to:
    modulate said defined DRM identifier with a modulation signal to get a light control signal; and
    output said light control signal to a light controller connected to a VLC-capable light source and configured to control said VLC-capable light source according to said light control signal to output a VLC signal.

12. The video distribution system according to claim 10, wherein the first outcome comprises said DRM identifier being equal to said defined DRM identifier, and wherein the second outcome comprises said DRM identifier being not equal to said defined DRM identifier.

13. The video distribution system according to claim 10, wherein the first outcome comprises said DRM identifier being not equal to said defined DRM identifier, and wherein the second outcome comprises said DRM identifier being equal to said defined DRM identifier.

14. The video distribution system according to claim 10, wherein said processor is further operative to:
    receive a user identifier associated with said at least one user device; and
    control distribution of said bitstream or of said bitstream obtained based on said stream of decoded video frames based on said comparison of said DRM identifier and said defined DRM identifier and based on said user identifier.

15. The video distribution system according to claim 14, wherein said processor is further operative to:
    compare said user identifier with any user identifier in a set of at least one authorized user identifier; and
    determine whether to distribute said bitstream or said bitstream obtained based on said stream of decoded video frames based on said comparison of said DRM identifier and said defined DRM identifier and based on whether said user identifier is present in said set of at least one authorized user identifier.

16. The video distribution system according to claim 10, wherein said processor is further operative to:
    identify at least one decoded video frame comprising said light pattern;
    remove said identified at least one decoded video frame from said stream of decoded video frames; and
    generate said bitstream by encoding decoded video frames of said stream of decoded video frames into encoded video frames without said identified at least one decoded video frame.

17. The video distribution system according to claim 10, wherein said processor is further operative to:
    identify at least one decoded video frame comprising said light pattern;
    replace at least a portion of said identified at least one decoded video frame with at least a portion of neighboring decoded video frame lacking said light pattern of said stream of decoded video frames; and
    generate said bitstream by encoding decoded video frames of said stream of decoded video frames into encoded video frames without said identified at least one decoded video frame.

18. A video distribution system comprising:
    a video decoder configured to decode, for at least one user device, encoded video frames of a bitstream received from said user device to get a stream of decoded video frames, said bitstream comprises encoded video frames representing video data captured by a camera of or connected to said user device;
    a pattern identifier configured to identify, in at least one decoded video frame of said stream of decoded video frames, a light pattern representing a visible light communication, VLC, signal captured by said camera of or connected to said user device;
    a pattern decoder configured to decode said light pattern into a digital rights management, DRM, identifier; and
    a distribution controller configured to control distribution of said bitstream or of a bitstream obtained based on said stream of decoded video frames based on a comparison of said DRM identifier and a defined DRM identifier, wherein controlling said distribution comprises,
        comparing said DRM identifier with said defined DRM identifier, and
        determining whether to distribute said bitstream or said bitstream obtained based on said stream of decoded video frames based on said comparison of said DRM identifier and said defined DRM identifier; wherein determining whether to distribute said bitstream comprises,
        making said bitstream or said bitstream obtained based on said stream of decoded video frames available for distribution from the video distribution system to consumers responsive to a first outcome of comparing said DRM identifier and said defined DRM identifier, and
        preventing distribution of said bitstream or of said bitstream obtained based on said stream of decoded video frames from the video distribution system to consumers responsive to a second outcome of comparing said DRM identifier and said defined DRM identifier, the second outcome being different than the first outcome.

19. A computer program product, comprising a non-transitory computer readable storage medium comprising computer readable program code embodied in the medium that when executed by a processor causes said processor to perform operations comprising:
    decoding, for at least one user device, encoded video frames of a bitstream received from said user device to get a stream of decoded video frames, said bitstream comprises encoded video frames representing video data captured by a camera of or connected to said user device;
    identifying, in at least one decoded video frame of said stream of decoded video frames, a light pattern representing a visible light communication, VLC, signal captured by said camera of or connected to said user device;
decoding said light pattern into a digital rights management, DRM, identifier; and
controlling distribution of said bitstream or of a bitstream obtained based on said stream of decoded video frames based on a comparison of said DRM identifier and a defined DRM identifier, wherein controlling said distribution comprises,
    comparing said DRM identifier with said defined DRM identifier, and
    determining whether to distribute said bitstream or said bitstream obtained based on said stream of decoded video frames based on said comparison of said DRM identifier and said defined DRM identifier; wherein determining whether to distribute said bitstream comprises,
    making said bitstream or said bitstream obtained based on said stream of decoded video frames available for distribution from the video distribution system to consumers responsive to a first outcome of comparing said DRM identifier and said defined DRM identifier, and
    preventing distribution of said bitstream or of said bitstream obtained based on said stream of decoded video frames from the video distribution system to consumers responsive to a second outcome of comparing said DRM identifier and said defined DRM identifier, the second outcome being different than the first outcome.

20. The video distribution system according to claim 18, wherein the first outcome comprises said DRM identifier being not equal to said defined DRM identifier, and wherein the second outcome comprises said DRM identifier being equal to said defined DRM identifier.

21. The video distribution system according to claim 18, wherein said distribution controller is further configured to receive a user identifier associated with said at least one user device, and control distribution of said bitstream or of said bitstream obtained based on said stream of decoded video frames based on said comparison of said DRM identifier and said defined DRM identifier and based on said user identifier.

22. The computer program product comprising a non-transitory computer readable storage medium according to claim 19, wherein the first outcome comprises said DRM identifier being not equal to said defined DRM identifier, and wherein said second outcome comprises said DRM identifier being equal to said defined DRM identifier.

23. The computer program product comprising a non-transitory computer readable storage medium according to claim 19, wherein controlling distribution further comprises receiving a user identifier associated with said at least one user device, and controlling distribution of said bitstream or of said bitstream obtained based on said stream of decoded video frames based on said comparison of said DRM identifier and said defined DRM identifier and based on said user identifier.

* * * * *